United States Patent
Van Woudenberg (10) Patent No.: US 7,215,634 B2
(45) Date of Patent: May 8, 2007

(54) MULTI-LAYER RECORD CARRIER AND METHOD OF MANUFACTURING THEREOF AND RECORDING THEREON, WITH REDUCED TRANSMISSION DIFFERENCES IN THE UPPER LAYER

(75) Inventor: Roel Van Woudenberg, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 387 days.

(21) Appl. No.: 09/994,272

(22) Filed: Nov. 26, 2001

(65) Prior Publication Data
US 2002/0080705 A1   Jun. 27, 2002

(30) Foreign Application Priority Data
Dec. 22, 2000  (EP)  .................................. 00204730
Mar. 9, 2001  (EP)  .................................. 01200894

(51) Int. Cl.
*G11B 7/00*  (2006.01)

(52) U.S. Cl. ............................... 369/275.3; 369/275.1; 369/283; 369/59.25

(58) Field of Classification Search ............. 369/275.1, 369/275.3, 94, 95, 59.25, 93, 283; G11B 7/24, G11B 3/24, 7/00, 7/004
See application file for complete search history.

(56) References Cited
U.S. PATENT DOCUMENTS
4,839,753 A * 6/1989 Ide et al. ...................... 360/48
(Continued)

FOREIGN PATENT DOCUMENTS
EP  1128368 A1  8/2001
(Continued)

OTHER PUBLICATIONS
By T. Narahara et al., Entitled: "Optical Disc System for Digital Video Recording", Techn. Digest ISOM/ODS (MD1) Jul. 11-15, 1999, Kauai Hawaii, SPIE vol. 3864 (1999), 50-52 and Jpn. J. Appl. Phys 39 Pt. 1 No. 2B (2000), 912-919.
(Continued)

*Primary Examiner*—A M Psitos (57) ABSTRACT

A multi-layer record carrier and method of manufacturing thereof and recording thereon, includes data written in units of blocks on tracks of at least two information layers. A first guard field is written at the start of a data block and a second guard field is written at the end of the data block. The power in the focused spot in the deepest of the at least two information layers is maintained substantially at an optimal value, by setting the length of the first and second guard fields such that the end position of the second guard field of a preceding data block is located within the area of the first guard field of the succeeding data block. Thereby, gap portions between the first and second guard fields can be prevented. Alternatively, the length of the first and second guard fields is set to be approximately equal to the sum of half the diameter of a recording beam in the upper one of the at least two information layers when focused on the lowest one of the at least two information layers and a maximum allowed misalignment between the two layers. Thereby, the area through which the beam passes in the information layer is of a uniform nature, when user data is being read or written. The at least two information layers are aligned by optically measuring and aligning alignment marks, such as header spokes, at predetermined measuring points.

19 Claims, 4 Drawing Sheets

U.S. PATENT DOCUMENTS

| | | | |
|---|---|---|---|
| 5,428,597 A * | 6/1995 | Satoh et al. | 369/275.1 |
| 5,589,995 A * | 12/1996 | Saito et al. | 360/48 |
| 5,703,867 A * | 12/1997 | Miyauchi et al. | 369/59.11 |
| 5,715,225 A | 2/1998 | Victora et al. | 369/94 |
| 5,764,620 A | 6/1998 | Satoh et al. | 369/275.1 |
| 5,778,257 A * | 7/1998 | Tsukatani et al. | 710/74 |
| 6,044,051 A * | 3/2000 | Miyagawa et al. | 369/47.19 |
| 6,115,340 A * | 9/2000 | Van Den Enden et al. | 369/47.28 |
| 6,208,603 B1 * | 3/2001 | Ishida et al. | 369/59.25 |
| 6,344,939 B2 * | 2/2002 | Oguro | 360/27 |
| 6,735,158 B1 * | 5/2004 | Futakuchi et al. | 369/53.31 |
| 6,850,469 B2 * | 2/2005 | Ogawa et al. | 369/47.22 |

FOREIGN PATENT DOCUMENTS

| | | | |
|---|---|---|---|
| WO | WO 97/29483 | * | 8/1997 |
| WO | WO0016320 | | 3/2000 |

OTHER PUBLICATIONS

By K. Schep et al., Entitled: Format Description and Evaluation of the 22.5 GB DVR Disc: Techn. Digest ISOM (Sep. 2000).

* cited by examiner

Decentering    Non - Angular    Combination

FIG. 4

Measurement positions    Aligned disk

FIG. 7

MULTI-LAYER RECORD CARRIER AND METHOD OF MANUFACTURING THEREOF AND RECORDING THEREON, WITH REDUCED TRANSMISSION DIFFERENCES IN THE UPPER LAYER

BACKGROUND OF THE INVENTION

1. Field of the Invention

The present invention relates to a multi-layer record carrier, such as, a recordable optical disk of the write-once or rewritable type, suitable to be scanned by a single scanning device and provided with at least two substantially parallel information layers, wherein data is written in units of blocks on tracks of the at least two information layers. Furthermore, the present invention relates to a method and a recording apparatus for recording data on such a record carrier, and a method of manufacturing such a record carrier.

2. Description of the Related Art

Optical data storage systems, such as optical disk drives, allow a storage of large quantities of data on an optical medium. The data is accessed by focusing a laser beam onto the recording layer of the medium and then detecting the reflected light beam. In reversible or rewritable phase-change systems, optical media with two stable phases is used. A data bit is stored on the media by converting a small local area to one stable phase. The data bit can be erased by reverting the written area back to the starting phase. The starting phase is typically a crystalline phase and the laser beam writes data by locally converting the material in the data layer to a stable amorphous phase. This can be achieved by heating the crystalline region above its melting point and then cooling it quickly so that the disordered structure gets fixed in place, resulting in an amorphous structure. The data bit can later be erased by converting the amorphous phase back to the starting crystalline phase. This is done when the amorphous region is heated and maintained at or above its crystallization temperature, or alternatively melted and slowly cooled until the region is crystallized. The data in this type of phase change system is read or detected as a change in reflectivity between a crystalline region and an amorphous region on the optical medium.

To increase the storage capacity of an optical disk, multiple recording layer systems have been proposed. An optical disk having two or more recording layers may be accessed at different spatially separated recording layers by changing the focal position of a lens. The laser beam is transmitted through the nearer recording layer to read and write data on the farther recording layer or layers. Multiple recording layer disks require that the intermediate recording layers between the disk surface onto which the laser light is incident and the last or farthest recording layer from that surface be light-transmissive. To maximize the disk storage capacity of such optical disks, the recording density is substantially constant across the entire disk surface.

In (rewritable) optical recording with random access, the data is usually written in units of ECC blocks (e.g., in CLV systems without headers), in fixed recording unit blocks of a fixed fraction of an ECC block, such as, for example, 2 Kbytes or 4 Kbytes of user data (e.g., in Zoned Constant Angular Velocity systems with headers where the distance between two headers is an integer multiple of these recording unit blocks), or in variable length fractions of an ECC block (e.g., in Digital Video Recording systems where the ECC block size is not an integer multiple of the distance between two headers, and writing is "simply" stopped before a header and restarted after a header with the inclusion of some segment run-in and segment run-out data to guarantee proper behavior of the electronics). These fractions of ECC blocks are called "Recording Frames" in DVR systems and "SYNC Frames" in DVD systems. In optical record carriers with headers, the record carrier is subdivided in sectors, each sector comprising a header containing an address uniquely identifying the sector and a recording unit block to which user data, preferably protected by an error detection and correction code (ECC), is recorded.

In DVR systems, a Zoned Constant Angular Velocity (ZCAV) system is used. In such systems, the capacity of a sector is not constant over the disk. The linear density is approximately constant and the number of tracks per zone is constant, but the length of a track (i.e., one circumference of the disc) is increasing with a factor of 2.4 from inner to outer radius of the disc, while the number of headers per revolution is constant. Thus, the number of bits between two headers is increasing. The DVR system and format is described in T. Narahara et al, "Optical Disc system for Digital Video Recording", Techn. Digest ISOM/ODS (MD1) Jul. 11–15, 1999, Kauai Hi., SPIE Vol. 3864 (1999), 50–52 and Jpn. J. Appl. Phys. 39 Pt. 1 No. 2B (2000), 912–919, and in K. Schep et al, "Format description and evaluation of the 22.5 GB DVR disc", Techn. Digest ISOM 2000 (September 2000).

When data is written, the newly written data has to be linked with the data that is already present in a controlled way to guarantee the validity of both the already present data as well as the newly written data. For example, when writing a new block behind an already written block, two measures are taken. First, the new block should not be written over the user data in the already present block. This is guaranteed by introducing a gap between the end of the present data block and the start of the new data block. Second, the new block should be read correctly, i.e., the reading electronics should have the ability to resettle, for example, the amplitude (by a gain control function) and the frequency and the phase (by a Phase Locked Loop for data detection). This is guaranteed by preceding the new data with a preamble field which contains a repeated pattern long enough for the circuitry to stabilize and be well settled before the first user data is read.

Figure 6:
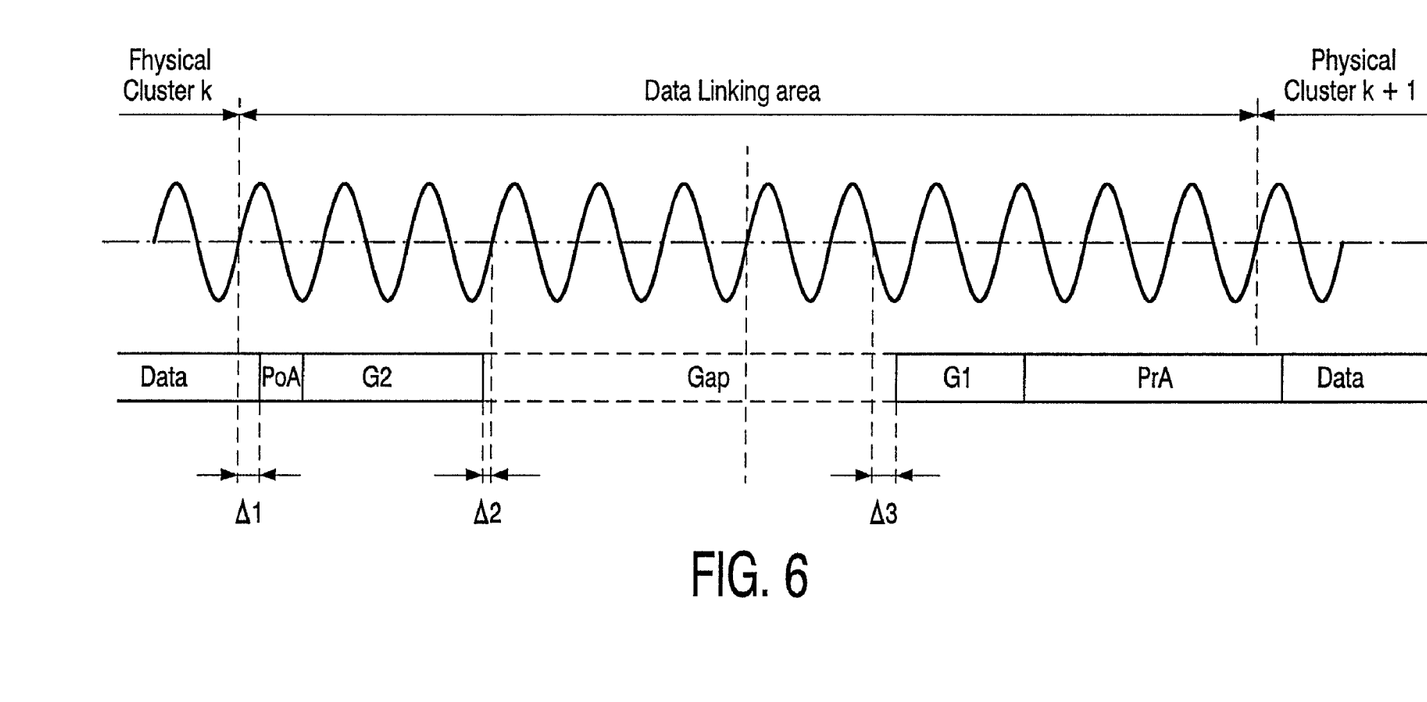
FIG. 6 shows a recording scheme with a data-linking area according to the prior art.

FIG. 6 shows a principle recording pattern of this general method wherein a recording unit block (i.e., a physical cluster) always ends with a postamble (PoA), i.e., a specific pattern to signal the end of user data (a kind of synchronization pattern), a guard field, i.e., a field containing dummy data to overwrite possible present old data which could confuse read-back of the newly written data such as, for example, the PoA of a previous recording, and a gap or gap portion to guarantee that the data of a possible present next cluster is not overwritten. The next recording unit block (i.e., the next physical cluster) starts with a gap, again to prevent overwriting, a guard field G1 and a preamble PrA. The area comprising the postamble PoA, the guard fields G1 and G2, the gaps and the preamble PrA is called the data linking area used for linking succeeding recording unit blocks (i.e., succeeding physical clusters).

The sinusoidal waveform indicated in FIG. 6 indicates a wobble signal recorded on the optical disk and used as a timing reference for deriving the write clock and as a position reference indicating the writing position. Predetermined maximum tolerances D1, D2 and D3 are allowed with respect to the start of the postamble PoA, and the end and start of the guard fields G1 and G2, respectively.

In dual or multi-layer systems, the above linking method leads to the problem that the lower layer is read while a significant area of the laser beam passes through the gaps of the upper layer or layers. Thus, the transmission characteristic or the degree of transmissivity of the upper layer differs in dependence on the gaps since the transmissivity of the upper layer is different in the written and in the non-written state. This problem increases when the gaps are large, such as, for example, in DVR systems where the gaps may have a length of typically about 150 μm while the diameter of the beam in the upper layer is about 40 μm when reading the lower layer and when the gaps are at the same angular position in neighboring tracks, such as, for example, on the radial areas of a CLV or ZCAV system where an integer number of ECC blocks fits almost exactly on an integer multiple of one or several circumferences.

Furthermore, in dual or multi-layer phase change disks, the effective power in the deepest (second) layer differs according to the physical structure of the upper (first) layer. For example, the transmission characteristics or the transmissivity of the header area and of the rewritable land/ groove area of a phase change disk are different. The effect of the header area in the upper layer on the deepest layer is the sum of two effects. First, the headers have a transmission characteristic which may differ from that of the land/groove area. When no data is recorded in the land/groove area, this difference is, in general, relatively small. However, when data is recorded in the land/groove area, the difference may be substantial. Secondly, just before and just after the header area, the groove is not yet written with phase change data due to the fact that in a DVR system, the segment run-in starts and the segment run-out ends with a gap before the data is actually written. This gap is used for, for example, the random start position shift (in the segment run-in) used for increasing the number of overwrite cycles in a phase change disk and as reserved space (in the segment run-out) when, for example, the bit length used is slightly longer than the nominal length due to inaccuracies when deriving the write clock from the wobble signal or when writing with a (non-locked) crystal clock. Moreover, after and before these gaps, a guard field and a preamble field PrA is written, e.g., to allow settlement of the electronics.

Thus, the transmission problem due to the gap portion in the upper layer occurs between data clusters and between a data cluster and a header area.

The transmission problem due to the header area is significantly increased in case of a (random) misalignment between the header spokes of the upper and of the lower information layers. Header alignment or correspondence requires a tight centering and angular alignment between the two layers. E.g., in the DVR system, less than approximately one wobble, i.e., less than 30 μm peak-to-peak, would be a preferred range for the displacement between the headers in the two information or recording layers. This displacement may result from unroundness (assumed to be small, i.e., less than a few μm), eccentricity (de-centering of the center of the spiral track with respect to the central hole) and angular difference. The de-centering of the spiral track with respect to the central hole is introduced mainly in the molding step of the disk mastering and replication process. The above-mentioned preferred allowed displacement range between the header corresponds to an allowed eccentricity of 15 μm peak-to-peak and an allowed angular misalignment of 0.015 degree.

U.S. Pat. No. 5,715,225 discloses a multi-layer optical record carrier and data storage device, wherein two separate optical heads are used to improve the alignment between the different information layers. Each optical head includes its own actuator. By using two separate actuators mechanically and electronically linked, tracking and sector information can be obtained from the appropriate recording layer of the optical storage device which was preformed or formatted. Thus, one of the optical heads is continuously focused on a recording layer which contains tracking and format information. This recording layer is not necessarily the recording layer on which user data is being recorded or read. Furthermore, U.S. Pat. No. 5,764,620 discloses a multi-layer optical record carrier in which the recording layers have sensitivity peaks in different wavelength, while allowing lights having the other wavelength to transmit therethrough. Each track on the recording layers is divided into a plurality of sectors, each of which having an identification section. The identification sections are shifted against one another in the tracking direction to thereby prevent the light beam from illuminating neighboring identification sections simultaneously. As a result, cross-talk or influences between neighboring identification sections can be reduced.

SUMMARY OF THE INVENTION

It is an object of the present invention to provide a multi-layer record carrier, a method and apparatus for recording on such a multi-layer record carrier, and a method of manufacturing such a multiple layer record carrier, by means of which transmission differences in the upper information or recording layers can be reduced without significantly increasing the complexity of the system.

This object is achieved by a multi-layer record carrier provided with at least two substantially parallel information layers and suitable to be scanned by a single scanning device, wherein data is written in units of data blocks on tracks of said at least two information layers, a first guard field being written at the start of a data block and a second guard field being written at the end of said data block, characterized in that said first and second guard fields have lengths such that the end position of said second guard field of a preceding data block is located within the area of said first guard field of a succeeding data block.

This object is further achieved in a method for recording data on a multi-layer recording carrier provided with at least two substantially parallel information layers, said method comprising:

a) a first writing step of writing the data in units of data blocks on tracks of said at least two information layers; and
b) a second writing step of writing a first guard field at the start of a data block and writing a second guard field at the end of a data block, characterized in that the method further comprises: c) a setting step for setting the lengths of said first and of said second guard field such that the end position of said second guard field of a preceding data block is located within the area of said first guard field of the succeeding data block.

In addition, the object is further achieved in a recording apparatus for recording such a multi-layer record carrier.

Accordingly, by setting the length of the first and second guard fields such that the end position of the second guard field of a preceding data block is located within the area of the first guard field of the succeeding data block, the gap portion between neighboring data clusters or data blocks is prevented. Thereby, a uniform transmissivity can be achieved in the upper layers, since no gaps are provided in the linking areas.

Furthermore, the above object is achieved by a multi-layer record carrier, a recording method, and a recording apparatus, in which the length of the first and the second guard fields is set to be greater or equal than half the diameter of a reading beam in the upper information layer when focused on the lowest layer plus an allowed misalignment between the two layers. Thereby, it can be assured that the length of the guard fields in the upper information layer is sufficient to provide an area with a uniform transmission characteristic or nature through which the beam passes in the upper layer within the beam diameter when focusing on the deepest layer. The whole area covered by the diameter of the reading beam in the upper layer thus comprises written data and no header or unwritten area.

The uniform transmission characteristic can be achieved by writing dummy data into the first and second guard fields.

Preferably, the length of a gap portion provided between the second guard field and the header area or between the header area and the first guard field is greater or equal than the predetermined minimum length of the first and second guard fields. In particular, the length of the gap portions may be equal to the length of the first and second guard fields. Thereby, the length of the gap in the upper layer is chosen such that the phase change data in the upper layer is not "seen" anymore by the reading beam when reading the header area in the deepest layer. By using, in the at least two information layers, the same length for the gap and guard fields, symmetry between the information layers can be achieved.

The optical alignment of the two information layers assures that the headers of the two layers are provided exactly on top of each other, such that the headers in the upper layer have no effect on the recording performance in the lower layer, since they are always facing another header. By the above proposed increase in the length of the guard field, it can be assured that the beam passes through a uniform, i.e., completely written, area when recording or reading the data in the deepest layer.

The optical measurement and alignment can be performed by using a camera device, such as a CCD (Charge Coupled Device) camera.

Preferably, the alignment marks may be header areas, e.g., header spokes, provided on the at least two information layers. In this case, the measuring points may comprise two points located on an inner diameter and an outer diameter of one spoke or at an outer diameter of two opposite spokes, and one point located on a spoke arranged at an angle of 90 degree with respect to said one spoke or said two opposite spokes, respectively. Thereby, two spokes of headers positioned perpendicular to each other can be aligned, such that the alignment is fully determined. In this way, two layers can be fully aligned in one step.

BRIEF DESCRIPTION OF THE DRAWINGS

The present invention will now be described in greater detail on the basis of a preferred embodiment with reference to the accompanying drawings, in which.

DESCRIPTION OF THE PREFERRED EMBODIMENTS

The preferred embodiment will now be described on the basis of an optical disk player for recording on and reproducing from a dual layer optical disk.

Figure 1:
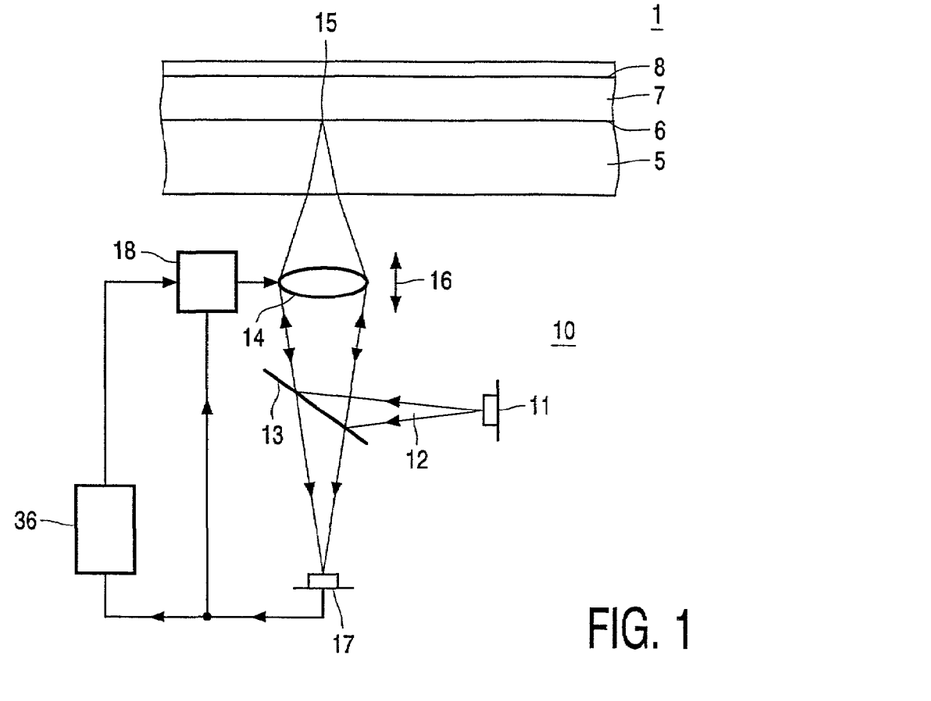
FIG. 1 shows a schematic diagram of a dual layer record carrier and a scanning device for an optical disk player according to the preferred embodiment of the present invention.

FIG. 1 shows a cross-section of the dual layer record carrier 1 and a scanning head of a scanning device 10 for optically scanning the information stored in the record carrier 1. The record carrier 1 has a transparent substrate 5 provided with a first information layer 6 and a second information layer 8 substantially parallel thereto, separated by a transparent spacer layer 7. Although only two information layers are shown in this embodiment of the record carrier 1, the number of information layers may be more than two.

The scanning device 10 comprises a radiation source 11, for example, a diode laser which generates a radiation beam 12, such as a laser beam. The radiation beam is formed to a focusing spot 15 via a beam splitter 13, for example, a semitransparent plate, and a lens system 14, for example, an objective lens. The focusing spot can be placed on any desired information layer by moving the objective lens 14 along its optical axis, as is denoted by the arrow 16. Since the first information layer 6 is partially transmissive, the radiation beam can be focused through this layer onto the second information layer 8. By rotating the record carrier 1 about its center and by displacing the focusing spot in a direction perpendicular to the tracks in the plane of the information layer, the entire information area of an information layer can be scanned by the focusing spot. The radiation reflected by an information layer is modulated by the stored information into, for example, an intensity or direction of polarization. The reflected radiation is guided by the objective lens 14 and the beam splitter 13 towards a detection system 17 which converts the incident radiation into one or more electric signals. One of the signals, the information signal, has a modulation which is related to the modulation of the reflected radiation, so that this signal represents the information which has been read. Other electric signals indicate the position of the focusing spot 15 with respect to the track to be read. The latter signals are applied to a servo system 18 which controls the position of the objective lens 14 and, hence, the position of the focusing spot 15 in the plane of the information layers and perpendicular thereto in such a way that the focusing spot follows the desired track in the plane of an information layer to be scanned.

Furthermore, the scanning device comprises means for causing the focusing spot to follow a track, for example, in the form of the above mentioned servo systems, and to displace the focusing spot from one to the other information layer. The last-mentioned displacement of the focusing spot can be realized by means of the servo system which retains the focusing spot on an information layer. The servo system 18 is controlled by a control unit 36 which operates in accordance with a control program to ensure correct reading of the recording tracks of the information layers 6, 8. The control program may also be used for writing and erasing information in the record carrier. Furthermore, a write clock may be derived from a wobble PLL clock generated on the basis of a pre-recorded wobble signal, and a write position may be derived from a wobble counter (not shown). The wobble PLL clock or frequency may further be used to control the disk rotation speed during writing.

It should be noted that the invention is also applicable for other disk structures, e.g., the DVR structure where the substrate serves as a rigid carrier (carrying embossed information), while readout is performed through a thin (100 mm) cover layer. Furthermore, a two-lens or dual-lens objective (e.g., as in the DVR system) may be used instead of the single objective lens 14 shown in FIG. 1.

According to the preferred embodiment, the power in the focused spot 15 in the deepest layer, i.e., the lower information layer 8, is kept at its optimal value by providing the following measures. Guard fields with dummy data are provided in the segment run-in and run-out area, with a length to prevent the recording in the deepest layer 8 to be effected by the empty-written transmission area in the upper layer 6. The length of the guard fields may be greater than or equal to a predetermined minimum length which corresponds to the sum of half the size of the beam in the upper information layer 6 when focused on the deepest or lower information layer 8 and the allowed misalignment. As an alternative, the length of the guard fields between successive data units which are not separated by a header area can be selected in such a manner that the guard fields overlap and a gap is prevented. Furthermore, the headers of the two or more information layers in the (re)writable optical disk can be aligned within a distance corresponding to the size of the beam in the upper layer when focused on the deepest layer. This may be achieved by an optical alignment procedure during disk manufacturing.

Figure 2:
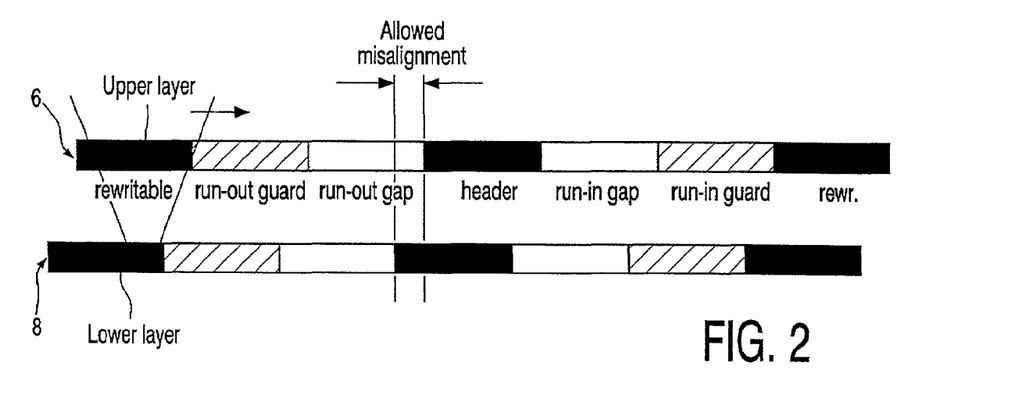
FIG. 2 shows a recording structure of an upper and lower recording layer according to the preferred embodiment.

FIG. 2 shows a recording scheme of the lower information layer 8 and the upper information layer 6, according to, e.g., the DVR format, comprising rewritable user data areas, a run-out guard field, a run-out gap, a header area, a run-in gap and a run-in guard. It should be noted that in FIG. 2, the preamble PrA and the postamble PoA are not indicated for reasons of simplicity. As can be gathered from FIG. 2, a minimum allowed misalignment is defined between the header areas of the upper information layer 6 and the lower information layer 8. Furthermore, a beam shape of a reading or writing beam is indicated in the left portion of the diagram, wherein the arrow above the upper information layer 6 indicates the scanning direction. The length of the run-out guard field and the run-in guard field is set or selected so that the area through which the beam passes in the upper information layer 6 is of a uniform nature (i.e., all written data, no header and no unwritten data) within the beam diameter when focusing on the deepest or lower information layer 8. Preferably, the length of the run-out gap and the run-in gap in the upper information layer 6 is chosen such that the phase change data in the upper information layer 6 is not "seen" anymore by the read-out beam when reading the header in the second information layer 8. However, this requirement regarding the length of the gaps is not a strict requirement, since the header area is designed very robustly, and the header detection is not expected to deteriorate much when the signal level (light intensity) is slowly varying.

For symmetry purposes between the two layers, it may be preferred to use the same length for the gaps and guard fields in both layers, although the gaps and guard fields in the lower information layer 8 have no particular protective role related to the dual layer recording system.

The above requirement regarding the length of the gaps and guard fields, leads to a predetermined minimum length of the guard fields (and gaps if full protection of the header area is implemented) of approximately the sum of half the diameter of the beam in the upper information layer 6 when focused on the lower information layer 8 and of the maximum allowed misalignment between the two layers.

Figure 3:
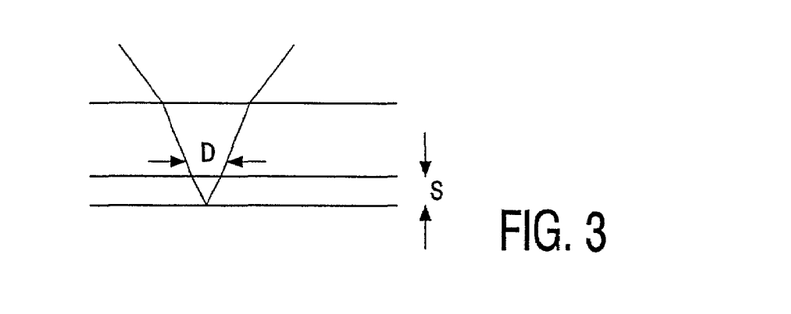
FIG. 3 shows a diagram indicating the relationship between the spacing between two recording layers and the diameter of a reading beam in the upper layer when focused on the lower layer.

FIG. 3 shows a schematic diagram based on which the relationship between the layer spacing S (between the lower layer 8 and the upper layer 6) and the beam diameter D in the upper information layer 6 can be derived. Based on FIG. 3, the relationship can be expressed as follows:

$$D = 2 \cdot S \cdot (a \sin(NA/n))$$

wherein D denotes the diameter of the beam in the upper information layer 6, NA denotes the numerical aperture (NA=n·sin α, wherein α denotes half of the angular aperture or collection angle of the scanning beam), S denotes the spacing or distance between the upper information layer 6 and the lower information layer 8, and n denotes the refractive index of the layer material. Assuming a distance S=30 μm, a half collection angle α=32–34.5°, and a refractive index n=1.5–1.6, a beam diameter in the upper information layer 6 of D=38–41 μm is obtained. By adding the allowed misalignment of, e.g., 30 μm, a total minimum length of the guard field of 68–71 μm is obtained.

The above-mentioned relatively tight requirement of alignment of the header areas can be achieved by the following optical alignment operation during the manufacturing of the optical record carrier.

Figure 4:
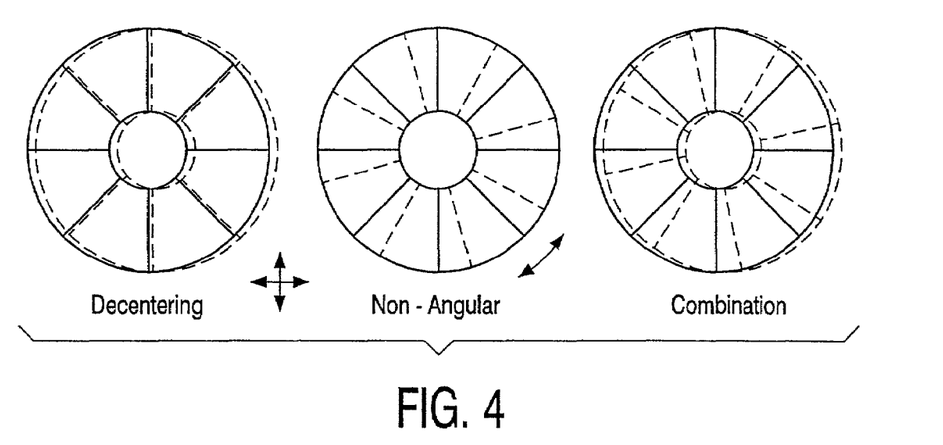
FIG. 4 shows different types of misalignments between two recording layers.

FIG. 4 shows different kinds of misalignments and their impact on the spokes of the header areas between the recording sectors of the upper and lower information layer 6, 8. In the pattern on the left side of FIG. 4, a de-centering of the center of the spiral recording track with respect to the central hole of the optical disk in the horizontal direction is shown. The same misalignment may occur in the vertical direction of FIG. 4. In the pattern shown in the middle of FIG. 4, an angular misalignment is shown, where the angles of the header spokes of the upper and lower information layers 6, 8 differ. A combination of the above two misalignment types is shown in the pattern on the right side of FIG. 4.

Figure 5:
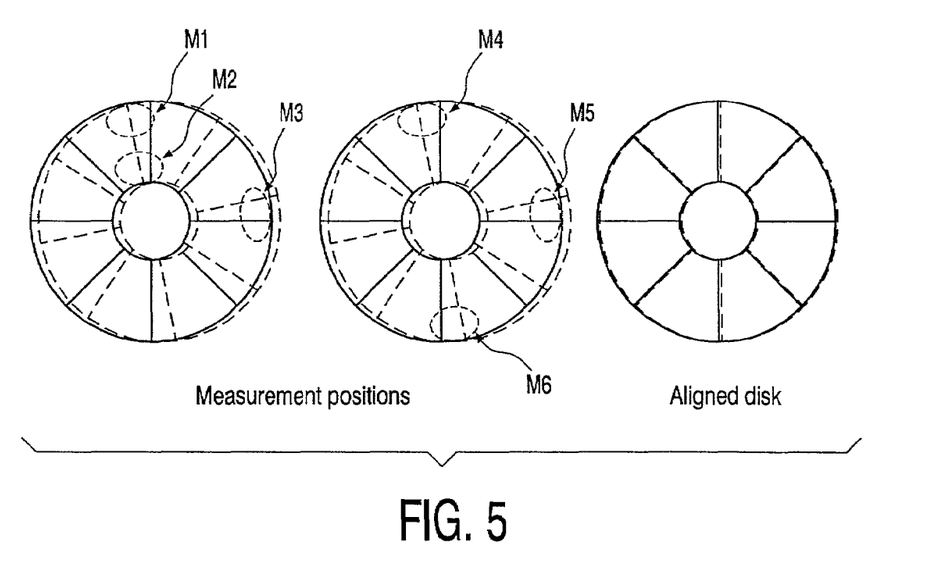
FIG. 5 shows different measurement positions for an alignment procedure and an aligned disk according to the preferred embodiment of the present invention.

An alignment within the small required tolerance is possible when an optical alignment is performed between the two information layers. By using an optical camera device, such as a CCD camera, accuracies down to 10 μm or better can be achieved. Preferably, an alignment can be performed where two spokes of headers positioned perpendicular to each other, i.e., at 0 and 90° relative angle, are aligned. This can be achieved by measuring and alignment at three measuring points, as shown in FIG. 5. According to the left pattern in FIG. 5, measuring points M1 and M2 are located at an inner diameter and an outer diameter along one header spoke, and one measuring point M3 is located at another spoke arranged under, substantially, 90° relative angle to the one header spoke. Alternatively, as shown in the middle pattern of FIG. 5, two measuring points M4 and M6 may be located at respective outer diameters of two opposite header spokes, and one additional third measuring point M5 may be located at a third spoke arranged under, substantially, 90° relative angle to the other two spokes. By the above two alternative locations of the measuring points, the alignment is fully determined. In this way, the two information layers can be fully aligned in one alignment step with respect to both de-centering as well as angular misalignment. Effectively, this method relaxes the two tight requirements for centering and angular alignment into one more relaxed requirement on the sum of the two requirements.

The pattern on the right side in FIG. 5 shows an aligned disk, where the header spokes of the lower information layer 8 and the upper information layer 6 are arranged at a displacement of less than 30 μm.

It is noted, that the above optical alignment procedure during the manufacturing of the optical record carrier is not restricted to align corresponding segments or header spokes or areas above each other. The alignment operation may as well be achieved by using any microscopically visible or a mechanical alignment mark in, e.g., the inner area of the disk or at its outer edge. Then, the alignment may as well be performed by using a camera device detecting the alignment mark, similar to the above procedure.

In the following, a measure for providing a uniform transmission characteristic for the recording pattern shown in FIG. 6 is described. As already mentioned, the gaps between the data clusters or data units lead to a variation in the transmission characteristic of the upper information layer 6.

Figure 7:
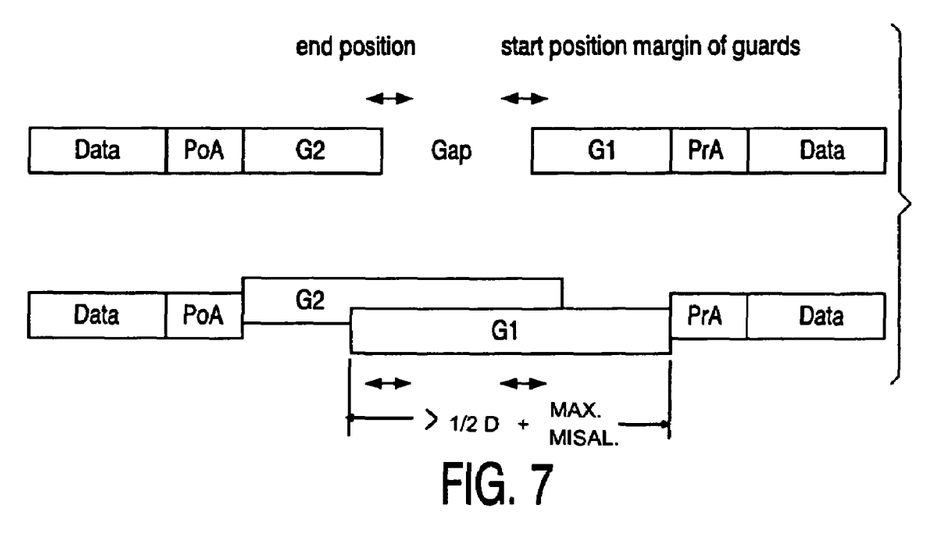
FIG. 7 shows recording schemes with data-linking areas according to the prior art and according to the preferred embodiment of the present invention.

FIG. 7 shows two recording schemes, wherein the upper one corresponds to the recording scheme shown in FIG. 6, and the lower one corresponds to a recording scheme according to the preferred embodiment, wherein the length of the guard portions G1 and G2 is selected to overlap or at least connect to each other, to thereby prevent a gap portion in between.

In particular, the time for supplying the dummy data of the guard fields G1 and G2 to the scanning device 10 is increased in such a manner that the length of the guard fields G1 and G2 are increased such that one guard field extends into the next or succeeding guard field, i.e., the guard field at the end of a block succeeds into the guard field at the start of the succeeding block. Thus, the guard fields G1 and G2 have such a length that their end/start position is in the next/previous guard field. Preferably, those parts or portions of the guard fields G1 and G2 which are never effected by the overlap should have a length sufficient to overwrite possible old data at that position, and sufficient for the electronics to resettle. However, in case a preamble PrA is provided, the length of this preamble PrA may already be sufficient enough. The start position of the guard field G1 at the start of a physical recording or data cluster may be varied on purpose, to increase cyclability, i.e., the maximum number of direct-overwrite cycles, with typically +/−64 to +/−1024 channel bits, depending on the format used, e.g., in DVR, a variation of +/−128 channel bits is allowed.

Thus, the above-described aspects introduced into the preferred embodiment of the present invention alone or in combination lead to a more uniform effective reading or writing power in the lowest information layer 8. Thus, the power in the focused spot 15 can be maintained at its optimal value.

It should be noted that the present invention is not restricted to the preferred embodiment described above, but can be used in any recording apparatus for recording on a record carrier, where at least two substantially parallel information layers are provided, e.g., magnetic or electric recording layers, wherein the recording data recorded on one information layer influence the reading or writing of the other information layer. The preferred embodiment may thus vary within the scope of the attached claims.

The invention claimed is:

1. A multi-layer record carrier provided with at least two substantially parallel information layers and capable of being scanned by a single scanning device, wherein data is written in units of data blocks on tracks of said at least two information layers, a first guard field being written at a start of a data block and a second guard field being written at an end of said data block,
   characterized in that in at least an upper information layer of said at least two substantially parallel information layers, said first and second guard fields have lengths such that an end position of said second guard field of a preceding data block in a track is located within an area of said first guard field of a succeeding data block in said track.

2. The multi-layer record carrier as claimed in claim 1, wherein the lengths of said first guard field and of said second guard field are selected such that those parts of said first guard field and of said second guard field which do not overlap each other have a predetermined minimum length.

3. The multi-layer record carrier as claimed in claim 1, wherein a predetermined preamble pattern is written between said first guard field and said data block, and a predetermined postamble pattern is written between said data block and said second guard field.

4. The multi-layer record carrier as claimed in claim 1, wherein said first and said second guard fields contain dummy data for overwriting previously recorded data.

5. A multi-layer record carrier having at least two substantially parallel information layers and capable of being scanned by a single radiation beam generated by a scanning device, wherein data is written in units of data blocks on tracks of said at least two information layers, a first guard field being written at a start of a data block and a second guard field being written at an end of said data block,
   characterized in that in at least an upper information layer of said at least two substantially parallel information layers, said first guard field and said second guard field each have a predetermined minimum length which is approximately equal to the sum of half the diameter of the radiation beam in the upper one of said at least two information layers when focused on the lowest one of said at least two information layers, and a maximum allowed misalignment between the two information layers.

6. The multi-layer record carrier as claimed in claim 5, wherein said length of said first and of said second guard field is equal in said at least two information layers.

7. The multi-layer record carrier as claimed in claims 5, wherein a gap portion is provided between said second guard field and a header area succeeding said second guard field and/or between said first guard field and a header area preceding said first guard field, the length of the gap portion being greater than or equal to said predetermined minimum length.

8. The multi-layer record carrier as claimed in claim 7, wherein said length of said gap portion is equal in said at least two information layers.

9. The multi-layer record carrier as claimed in claim 5, wherein said first and said second guard fields contain dummy data for overwriting previously recorded data.

10. A method for recording data on a multi-layer record carrier having at least two substantially parallel information layers, said method comprising the steps:
   a) writing the data in units of data blocks on tracks of said at least two information layers; and b) writing a first guard field at the start of a data block and writing a second guard field at the end of a data block, characterized in that the method further comprises the step:

c) setting the lengths of said first and of said second guard field in at least an upper information layer of said at least two substantially parallel information layers, such that the end position of said second guard field of a preceding data block in a track is located within the area of said first guard field of the succeeding data block in said track.

11. The method as claimed in claim 10, wherein said setting step is performed such that those parts of said first and of said second guard field which do not overlap each other are set to have a predetermined minimum length.

12. The method as claimed in claim 10, wherein said method further comprises the step of:
writing dummy data into said first and said second guard field.

13. A method for recording data on a multi-layer record carrier by scanning the record carrier with a single radiation beam, said record carrier having at least two substantially parallel information layers, said method comprising the steps:

a) writing said data in units of data blocks on tracks of said at least two information layers; and b) writing a first guard field at the start of a data block, and a second guard field at the end of a data block, characterized in that the step of writing said first and second guard fields comprises:

c) writing said first guard field and said second guard field in at least an upper information layer of said two substantially parallel information layers such that the length of said first and of said second guard field is greater than or equal to a predetermined minimum length which is approximately equal to the sum of half the diameter of the radiation beam in the upper one of said at least two information layers when focused on the lowest one of said at least two information layers, and a maximum allowed misalignment between the two information layers.

14. The method as claimed in claim 13, wherein said method further comprises the step of:
setting said length of said first and of said second guard field to be equal in said at least two information layers.

15. The method as claimed in claim 13, wherein the record carrier comprises a gap portion provided between said second guard field and a header area succeeding said second guard field and/or between said first guard field and a header area preceding said first guard field, and wherein the method further comprises the step of:
setting the length of the gap portion so as to be greater than or equal to said predetermined minimum length.

16. The method as claimed in claim 15, wherein said method further comprises the step of:
setting said length of said gap portion to be equal in said at least two information layers.

17. The method as claimed in claim 13, wherein said method further comprises the step of:
writing dummy data into said first and said second guard fields.

18. A recording apparatus for recording data on a multi-layer record carrier having at least two substantially parallel information layers, said recording apparatus comprising:

a) a recording unit for writing said data in units of data blocks on said multi-layer record carrier, wherein a first guard field is written at the start of a data block and a second guard field at the end of a data block; and b) control means for controlling said recording unit so as to write said data blocks and said first and second guard fields on tracks of said at least two information layers, characterized in that said control means controls said recording unit so as to write said first and said second guard fields, in at least an upper information layer of said at least two substantially parallel information layers, with a length such that the end position of said second guard field of a preceding data block in a track is located within the area of said first guard field of the succeeding data block in said track.

19. A recording apparatus for recording data on a multi-layer record carrier having at least two substantially parallel information layers, said apparatus comprising:

a) a radiation source for generating a radiation beam;

b) a recording unit for writing said data in units of data blocks on said multi-layer record carrier using said radiation beam, wherein a first guard field is written at the start of a data block and a second guard field is written at the end of a data block; and c) control means for controlling said recording unit so as to write said data blocks and said first and second guard fields on tracks of said at least two information layers, characterized in that said control unit controls said recording unit so as to write said first and said second guard fields, in at least an upper information layer of said at least two substantially parallel information layers, with a length greater than or equal to a predetermined minimum length which is approximately equal to the sum of half the diameter of the radiation beam in the upper one of said at least two information layers when focused on the lowest one of said at least two information layers, and a maximum allowed misalignment between the two information layers.

* * * * *